(No Model.)

E. CHESTERMAN.
PASSENGER CAR.

No. 269,917. Patented Jan. 2, 1883.

Attest:
J. E. Chesterman.
Geo. M. Streeter.

Inventor
Edwin Chesterman

UNITED STATES PATENT OFFICE.

EDWIN CHESTERMAN, OF PHILADELPHIA, PENNSYLVANIA.

PASSENGER-CAR.

SPECIFICATION forming part of Letters Patent No. 269,917, dated January 2, 1883.

Application filed October 30, 1882. (No model.)

*To all whom it may concern:*

Be it known that I, EDWIN CHESTERMAN, of Philadelphia, Pennsylvania, have invented certain Improvements in Passenger-Cars, of which the following is a specification.

The object is to provide a car having two compartments separated from each other in such manner that one compartment may be used for a smoking-room without the fumes of tobacco entering the other compartment, and both compartments be accessible from the same platform.

The invention consists in the combination of a car having two compartments and an open platform provided with steps at each end extending across the car between said compartments, separating one from the other, and admitting of access to the car from the street on either side, and forming an entrance to both compartments, as will be more particularly set forth in the following specification and accompanying drawings, in which—

Figure 1:
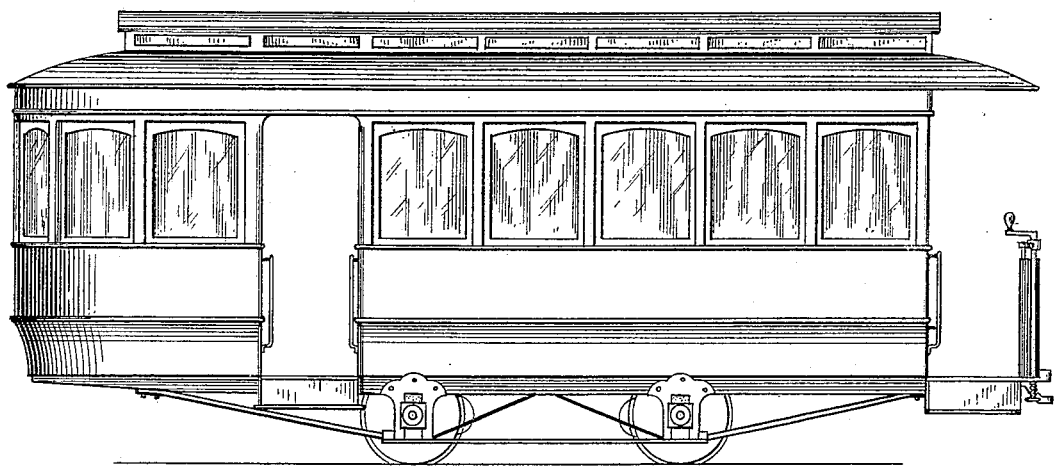
Figure 2:
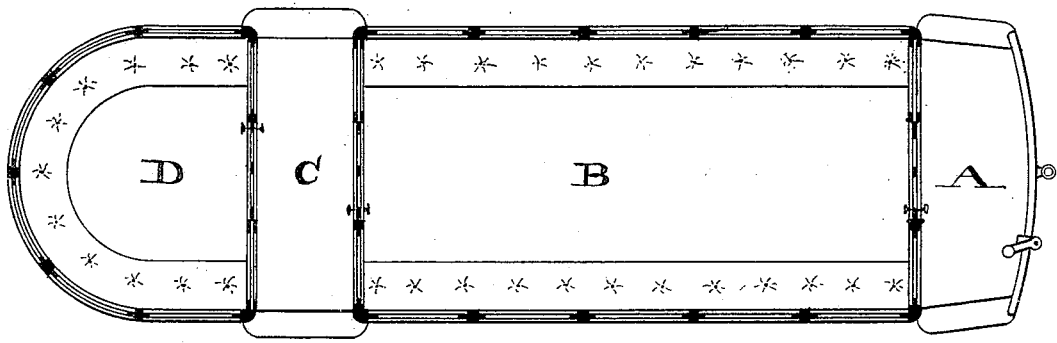

Figure 1 is an elevation, and Fig. 2 is a plan.

A is the front platform, B is the front compartment, C is the back or intermediate platform, and D is the rear compartment, of the car. The front platform, the front compartment, the roof, and the running-gear are constructed in the ordinary and well-known manner in which street-cars are made. The front compartment is complete in itself. Its roof extends forward to cover the front platform and backward far enough to cover both the intermediate platform and the rear compartment. The front platform is a separate structure connected to the front compartment, and supported by brackets fastened on the under side of said front compartment and extending forward under the platform. The intermediate platform is formed across the car as near the back wheels as practicable, and is open at both ends to form a cut-off between the two compartments, and is provided with steps as a means of access from the street at each side. These steps do not project into the street beyond the full width of the car, so as to come into contact with passing vehicles; but the platform is shortened the width of the step at each end, and is placed on a level below the sill of the car. The sides of the car are curved or project outward some three or four inches beyond the sill. To admit of the steps being placed within the width of the car and the platform on a level below the sill of the car, the said sill (or longitudinal support of the front compartment) is not extended backward to form the sill or support of the rear compartment; but said rear compartment is a separate structure connected to the rear platform at the points where the "dasher" or guard-rail is usually placed, and together with said platform is supported by brackets extending under the rear platform and fastened on the under side of the front compartment. This extension or rear compartment is constructed in the same manner as the front compartment. The front end of this rear compartment is provided with a door and windows opening into the intermediate platform in the same manner as the back end of the front compartment.

The roof, which, as before described, extends backward from the front compartment over the intermediate platform and rear compartment, is securely fastened to said rear compartment and gives strength and rigidity to the car. In the present case the rear compartment is circular in form; but this is a matter of convenience only. The roof is provided with ventilators on top in the usual manner; but partitions are placed extending upward over the entrance-doors to the roof to prevent smoke passing from the rear to the forward compartment.

From the foregoing description it will be seen that the intermediate platform is common to both the front and rear compartments, and separates one from the other, is open, and has steps at each end within the width of the car as a means of access from the street; that persons may enter either compartment without coming in contact with the occupants of the other, and that, if persons are smoking in the rear compartment and the fumes of tobacco should escape in a forward direction when the door is open, the platform intervening would act as a cut-off and the tobacco-fumes be wafted away by the air drawing across the platform, instead of penetrating into the front compartment, and also that the conductor, occupying the said intermediate platform, can attend to his duties in both compartments without leaving the car.

If desired, the rear compartment may be provided with a separate entrance by a doorway at the back end, and the entrance from the intermediate platform be dispensed with, leaving openings through which the conductor may collect fares and attend to other wants of the passengers.

I claim as of my invention—

1. In a car, the combination of two compartments separated from each other by a platform running transversely across the car, and provided with a step at each end and as a means of access from the street on either side, and forming an entrance to both compartments, substantially as set forth.

2. In a car, the combination of two compartments with a platform provided with steps at each end extending transversely across the car, to admit of access from the street on either side and separate each compartment from the other, and partitions dividing said platform from said compartments, access to which is had from the platform through a doorway in said partition, substantially as set forth.

3. In a car, the combination of two inclosed compartments separated from each other by an open platform running transversely across the car, and provided with steps at each end as a means of access, accessible from the street on either side, and forming an entrance to or means of communication with both of said compartments, substantially as set forth.

4. In a car, the combination of two inclosed compartments, an open platform provided with steps at each end, and extending transversely across the car between said compartments to separate each from the other, and admit of access from the street on either side, and from which platform entrance to or communication with said compartments can be had through a doorway or other opening in the partition which divides the platform from the respective compartments, substantially as set forth.

EDWIN CHESTERMAN.

Witnesses:
F. E. CHESTERMAN,
GEO. M. STREETER.